Figure 1:
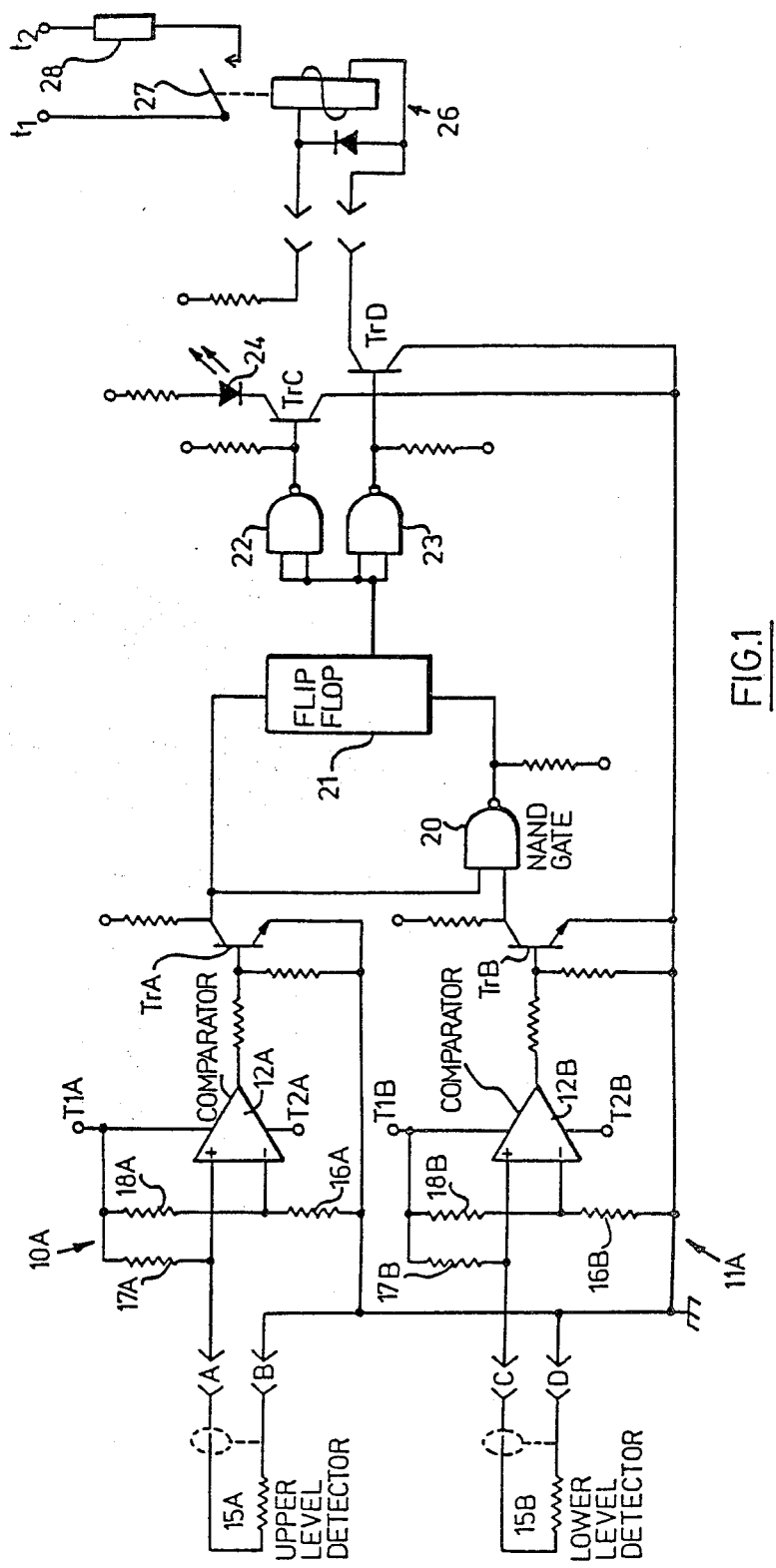

United States Patent [19]

Johnson et al.

[11] 4,404,809

[45] Sep. 20, 1983

[54] LIQUID NITROGEN LEVEL CONTROLLER

[75] Inventors: Arthur W. Johnson, Ottawa; Howard R. Braun, Almonte, both of Canada

[73] Assignee: Her Majesty the Queen in right of Canada, as represented by the Minister of National Defence, Ottawa, Canada

[21] Appl. No.: 401,374

[22] Filed: Jul. 23, 1982

[30] Foreign Application Priority Data

Aug. 20, 1981 [CA] Canada .................................. 384251

[51] Int. Cl.³ .............................................. F17C 13/02
[52] U.S. Cl. ....................................... 62/49; 73/295; 137/392
[58] Field of Search ............... 137/392; 73/295; 62/49

[56] References Cited

U.S. PATENT DOCUMENTS

| | | | |
|---|---|---|---|
| 3,262,280 | 7/1966 | Chaney | 62/49 |
| 3,740,740 | 6/1973 | Milo | 73/295 |
| 3,792,456 | 2/1974 | Hill | 73/295 |
| 3,882,967 | 5/1975 | Gulla et al. | 73/295 |
| 3,914,950 | 10/1975 | Fletcher et al. | 62/49 |
| 4,053,874 | 10/1977 | Glaser | 73/295 |
| 4,059,424 | 11/1977 | Beutz | 62/49 |
| 4,135,548 | 1/1979 | Sears | 62/49 |
| 4,192,147 | 3/1980 | Gilbert et al. | 62/49 |
| 4,334,410 | 6/1982 | Drumare | 62/49 |
| 4,356,728 | 11/1982 | Gomez | 73/295 |

*Primary Examiner*—Ronald C. Capossela
*Attorney, Agent, or Firm*—William R. Hinds

[57] ABSTRACT

A temperature sensitive liquid level controlling apparatus employs a pair of carbon resistors, each having a resistance which changes in response to immersion in a low temperature liquid, for determining upper and lower levels of the liquid in a container. The resistances of the resistors are compared with those of reference resistors to provide a signal for controlling a flow of the liquid into the container. A liquid cooling system incorporating this liquid level controlling apparatus displaces the liquid from a second container into the first-mentioned container by supplying a gaseous phase of the liquid into the second container, the signal being used to operate a two-way valve in the liquid passage for venting the second container through the liquid passage and for permitting the flow of the liquid from the second container through the liquid passage.

7 Claims, 2 Drawing Figures

LIQUID NITROGEN LEVEL CONTROLLER

The present invention relates to temperature sensitive liquid level controlling apparatus for use with low temperature liquid, and to a cooling system incorporating such apparatus.

In equipment requiring continuous cooling by liquid nitrogen or liquid helium, it is often convenient to automate a system for supplying the liquid nitrogen or liquid helium to the equipment in order to ensure uninterrupted low temperature operation.

An automatic system, in some cases, results in a more even temperature of operation and, in addition, reduces excessive loss by evaporation of coolant occasioned by manual transference of the coolant.

Automatic operation also permits unattended initiation of a cooling cycle, for example at night or during weekends, by use of timers when it is not considered desirable to maintain the equipment continuously at low temperature.

It has been previously proposed to provide a liquid level controller having one or more liquid level sensors, control circuits and auxiliary equipment associated with the transfer of a coolant. Such sensors, which may comprise carbon or copper wire resistors, diodes or thermocouples, are characterized by a reproducible change in resistance in response to temperature, which can be exploited to trigger or initiate the supply of the coolant into a container when the liquid in the container falls below a predetermined level. A second sensor or a timer is used to interrupt the supply of the coolant when the liquid level has risen in the container to a predetermined level.

If the change in resistance of the sensor is insufficient to activate the controller, which may occur because the temperature gradient between the coolant liquid and its vapour is too small, it is necessary to heat the sensor by passing a low current through it or by employing a separate heater.

The prior art controllers occasionally operate erratically because of splashing of the coolant, especially during filling. This problem has been alleviated somewhat by the use of a plane air capacitor as the sensor or by the use of an entirely mechanical system.

It is an object of the present invention to provide a novel and improved temperature sensitive liquid level controlling apparatus which is sufficiently sensitive to detect a change in resistance of a sensor resistor as the level of a low temperature liquid falls below the sensor resistor and which is less affected by moderate splashing than prior art apparatus.

According to the present invention, there is provided a temperature sensitive liquid level controlling apparatus comprising a container for holding a supply of low temperature liquid, first and second carbon resistors each having resistance which changes in response to immersion in the liquid, the first and second carbon resistors being positioned to determine upper and lower levels, respectively, of the liquid in the container, first and second means for detecting the changes of resistance of the first and second carbon resistors, the first and second change detecting means comprising first and second reference resistors and first and second means for comparing the resistances of the first and second carbon resistors with the resistances of the first and second reference resistors, respectively, and means responsive to the outputs of said first and second comparing means for controlling a flow of the liquid into the container.

Preferably, the first and second carbon resistors and the first and second reference resistors are provided in voltage defining circuits connected to the comparing means, the output responsive means comprising means for inverting the outputs of the comparing means, a NAND gate responsive to the inverted output, a flip-flop responsive to the NAND gate and relay means responsive to the flip-flop.

The present invention provides a cooling system comprising a first container for apparatus to be cooled, a second container for holding a supply of a low temperature liquid, a liquid passage communicating with the first and second containers for conducting the low temperature liquid from the second container to the first container, means for supplying a gas into the second container for expelling the low temperature liquid through the liquid passage to the first container, the liquid passage serving as a vent for venting the second container, first and second carbon resistors each having a resistance which changes in response to immersion in the liquid, the first and second carbon resistors being positioned to determine upper and lower levels, respectively, of the liquid in the first container, first and second means for detecting the changes of resistance of the first and second carbon resistors, the first and second change detecting means comprising first and second reference resistors and first and second means for comparing the resistances of the first and second carbon resistors with the resistances of the first and second reference resistors, respectively, and means responsive to the outputs of the first and second comparing means for controlling the flow of the low temperature liquid through the liquid passage to the first container.

Figure 2:
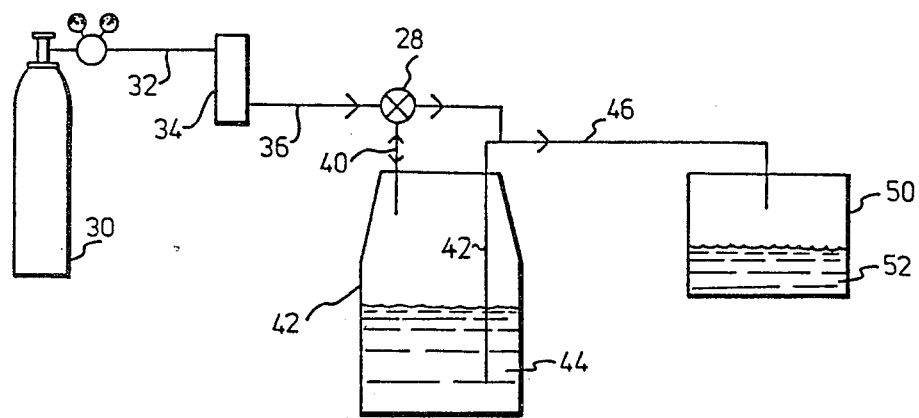

The invention will be more readily understood from the following description of a preferred embodiment thereof given, by way of example, with reference to the accompanying drawings, in which:

FIG. 1 shows a circuit diagram of a temperature sensitive liquid level controlling apparatus; and FIG. 2 shows a diagrammatic view of a cooling system.

Referring now to the circuit diagram of the temperature sensitive liquid level controlling apparatus illustrated in FIG. 1, reference numerals 10A and 11A indicate generally a pair of voltage divider circuits which are respectively associated with comparators 12A and 12B.

The voltage dividers, which are connected across current supply terminals T1A and ground, and T1B and ground, respectively, include carbon resistors 15A and 15B, respectively, which serve as upper and lower level detectors, respectively, for determining the upper and lower levels of a low temperature liquid in a container for equipment to be cooled by the liquid.

The resistors 15A and 15B each have a resistance R which increases upon immersion of the resistors 15A and 15B in the low temperature liquid, e.g. nitrogen.

Reference resistors 16A and 16B are chosen to have a resistance having a value which lies within the range over which the resistance R varies as the resistors 15A and 15B are immersed in the low temperature liquid or are above the level of the low temperature liquid.

For example, in the present embodiment of the invention the resistors 15A and 15B have a nominal resistance of 1.5 k$\Omega$ and a room temperature resistance of 1.4 k$\Omega$ and, when immersed in liquid nitrogen, their resistance increases to 2.3 k$\Omega$. In the vapour just above the liquid nitrogen, their resistance is 1.7 k$\Omega$. The resistance of the resistors 16A and 16B was accordingly chosen to be 2.0 k$\Omega$ plus or minus 1%.

While the resistance of the reference resistors 16A and 16B must be selected to correspond to the mean resistance of the sensor resistors 15A and 15B in liquid nitrogen and in the vapour, the actual value of the resistance of the sensor resistors 16A and 16B is not critical, provided that it is low enough to ensure low noise operation of the comparators 12A and 12B yet high enough to provide adequate sensitivity.

The resistors 15A and 15B are connected between the terminals T1A and T1B, respectively, and ground in series with a matched resistor 17A and 17B, respectively, to provide control of voltage signals to the non-inverting inputs of the comparators 12A and 12B, respectively, and the reference resistors 16A and 16B are likewise connected in series with matched resistors 18A and 18B, respectively, to provide reference voltage signals to the inverting inputs of the comparators 12A and 12B.

The outputs of the comparators 12A and 12B are connected to the bases of transistors TrA and TrB, the collectors of which are connected to respective inputs of a NAND gate 20 and a flip-flop 21.

The output of the flip-flop 21 is connected to NAND gates 22 and 23, the NAND gate 22 being connected to the base of a transistor TrC for controlling the operation of a photodiode 24 and the output of the NAND gate 23 being connected to a transistor TrD for operating a relay indicated generally by reference numeral 26 and having a relay contact 27 controlling the energization of a solenoid valve 28.

The operation of the above-described circuit is as follows.

When either of the sensor resistors 15A and 15B is immersed in the liquid nitrogen, the control voltage applied to the non-inverting input of the respective comparative 12A or 12B is higher than the reference voltage applied to the inverting input thereof, and the comparator therefore saturates positively. The converse occurs when either of the sensor resistors 15A and 15B is in nitrogen vapour.

The outputs of the comparators are inverted and converted to TTL logic level by the transistors TrA and TrB for controlling the NAND gate 20 and the flip-flop 21.

The filling cycle is initiated when the lower sensor resistor 15B is no longer immersed in liquid nitrogen. The comparator 12B then saturates negatively, the NAND gate presets the flip-flop and the relay 26 closes to energize the solenoid operated valve 28 by means of an electrical current supplied to terminals T1 and T2 from an electrical supply (not shown).

At the end of the cycle, the comparator 12A saturates positively and the output of the transistor TrA clears the flip-flop 21.

Referring now to FIG. 2, which diagramatically illustrates a cooling system employing the above-described liquid level controlling system of FIG. 1, a gas cylinder 30 for containing a supply of nitrogen gas under pressure is connected by a first pipe 32 to the inlet of a drying column 34, the outlet of which is connected through a second pipe 36 to the two-way solenoid operated valve 28.

One outlet of the valve 28 is connected through a pipe 40 to the interior of a container 42, in the form of a Dewar, for containing a supply of liquid nitrogen 44.

The other outlet of the valve 38 is connected through a pipe 45 to the interior of the container 42 and through a further pipe 46 to the interior of a container 50.

The container 50 serves to contain an apparatus or object (not shown) which is to be cooled by a body of liquid nitrogen 52, the level of the liquid nitrogen in the container 50 being controlled by the liquid level controlling system of FIG. 1 and, more particularly, by the energization and de-energization of the solenoid operated valve 28.

The solenoid operated valve 28 is arranged so that, upon energization of this valve, the pipe 36 is placed in communication with the pipe 40 but closed off from the pipes 45 and 46, so that nitrogen gas is supplied under pressure from the gas cylinder 30 through the pipe 40 into the container 42 to expel liquid nitrogen into the container 50 through the pipes 45 and 46.

The level of the body 52 of liquid nitrogen in the container 50 is sensed by the upper and lower level detectors which are described above with reference to FIG. 1 and appropriately located in the container 50, but not shown in FIG. 2.

Upon de-energization of the solenoid valve 28, the pipe 36 is disconnected from the pipe 40 by the valve 28 which, however, then permits nitrogen gas boiled off from the liquid nitrogen 44 in the container 42 to be vented through the pipes 40 and 46, thus preventing icing in the pipe 46.

The embodiments of the invention in which an exclusive property or privilege is claimed are defined as follows:

1. Temperature sensitive liquid level controlling apparatus, comprising:
   a container for holding a supply of a low temperature liquid;
   first and second carbon resistors each having a resistance which changes in response to immersion in said liquid;
   said first and second carbon resistors being positioned to determine upper and lower levels, respectively, of said liquid in said container;
   first and second means for detecting the changes of resistance of said first and second carbon resistors;
   said first and second change detecting means comprising first and second reference resistors and first and second means for comparing the resistances of said first and second carbon resistors with the resistances of said first and second reference resistors, respectively; and
   means response to the outputs of said first and second comparing means for controlling a flow of said liquid into said container.

2. Temperature sensitive liquid level controlling apparatus as claimed in claim 1, wherein said first and second carbon resistors and said first and second reference resistors are provided in voltage dividing circuits connected to said comparing means.

3. Temperature sensitive liquid level controlling apparatus as claimed in claim 1, wherein said output responsive means comprise means for inverting the outputs of said comparing means, a NAND gate responsive to said inverted outputs, a flip-flop responsive to said NAND gate and relay means responsive to said flip-flop.

4. Temperative sensitive liquid level controlling apparatus as claimed in claim 1, further comprising means for providing an indication of operation of said control means to effect the flow of liquid into said container.

5. Temperature sensitive liquid level controlling apparatus as claimed in claim 1, comprising means for supplying a gaseous phase of the liquid into said container for feeding the liquid from the container.

6. A cooling system, comprising:

a first container for apparatus to be cooled;

a second container for holding a supply of a low temperature liquid;

a liquid passage communicating with said first and second containers for conducting the low temperature liquid from said second container to said first container;

means for supplying a gas into said second container for expelling the low temperature liquid through said liquid passage to said first container;

said liquid passage serving as a vent for venting said second container;

first and second carbon resistors each having a resistance which changes in response to immersion in said liquid;

said first and second carbon resistors being positioned to determine upper and lower levels, respectively, of said liquid in said first container;

first and second means for detecting the changes of resistance of said first and second carbon resistors;

said first and second change detecting means comprising first and second reference resistors and first and second means for comparing the resistance of said first and second carbon resistors with the resistances of said first and second reference resistors, respectively; and means responsive to the outputs of said first and second comparing means for controlling the flow of the low temperature liquid through said liquid passage to said first container.

7. A cooling system as claimed in claim 6, wherein said flow controlling means comprise two-way valve means for venting the vapour through said liquid passage in a first condition of said valve means and for interrupting the venting and permitting the liquid flow through said liquid passage in a second condition of said valve means.

* * * * *